United States Patent [19]

Stevens et al.

[11] Patent Number: 5,949,760
[45] Date of Patent: *Sep. 7, 1999

[54] SIMULTANEOUS CHANNEL ACCESS TRANSMISSION METHOD FOR A MULTI-HOP COMMUNICATIONS RADIO NETWORK

[75] Inventors: James A. Stevens, Allen; C. David Young; Richard C. Sunlin, both of Plano, all of Tex.

[73] Assignee: Rockwell International Corporation, Costa Mesa, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/821,482

[22] Filed: Mar. 21, 1997

[51] Int. Cl.[6] .................................................. H04J 3/14
[52] U.S. Cl. ........................ 370/254; 370/330; 370/351; 370/436
[58] Field of Search .................................. 370/330, 329, 370/332, 256, 406, 400, 401, 436, 343, 344, 345, 347, 254, 351

[56] References Cited

U.S. PATENT DOCUMENTS

| | | | |
|---|---|---|---|
| 4,308,613 | 12/1981 | Chasek | 370/396 |
| 4,612,637 | 9/1986 | Davis et al. | 370/348 |
| 4,639,914 | 1/1987 | Winters | 370/334 |

(List continued on next page.)

OTHER PUBLICATIONS

Chlamtac, I. et al., Fair Algorithms for Maximal Link Activation in Multihop Radio Networks, IEEE Transactions on Communications, vol. Com–35, No. 7, Jul. 1987.

I. Chlamtac & A. Lerner, "A Link Allocation Protocol for Mobile Multi–Hop Radio Networks", Proc. GLOBECOM 85, pp. 238–242, Dec. 1985, pp. 238–242.

I. Chlamtac & S. S. Pinter, "Distributed Node Organization Algorithm for Channel Access in a MultiHop Dynamic Radio Network", IEEE Trans. Computers, vol. 36, Jun. 1987, pp. 728–737.

I. Chlamtac & A. Lerner, "Fair Algorithms for Maximal Link Activation in Multihop Radio Networks", IEEE Trans. Comm, vol. 35, No. 7, Jul. 1987, pp. 739–746.

C. G. Prohazka, "Decoupling Link Scheduling Constraints in Multihop Packet Radio Networks", IEEE Trans. Computers vol. 38, No. 3, Mar., 1989, pp. 455–458.

S. Deering, "Host Extensions for IP Multicasting", Internet Engineering Task Force Request for Comments 1112, Stanford University, Aug. 1989, pp. 1–17.

I. Cidon & M. Sidi, "Distributed Assignment Algorithms for Multihop Packet Radio Networks", IEEE Trans. Computers, vol. 38, No. 10, Oct. 1989, pp. 1353–1361.

L.C. Pond & V. O.K. Li, "A Distributed Time–Slot Assignment Protocol for Mobile Multi–Hop Broadcast Packet Radio Networks", Proc. IEEE MILCOM '89, vol. 1, Nov. 1989, pp. 70–74.

(List continued on next page.)

*Primary Examiner*—Alpus H. Hsu
*Attorney, Agent, or Firm*—Kyle Eppele; James P. O'Shaughnessy

[57] ABSTRACT

A method for establishing simultaneous communications between nodes having neighboring nodes in a multi-hop network of transceiver nodes arranged in neighborhoods includes determining the quality of communication links between the nodes of a neighborhood and adjacent neighborhoods. A table of quality data is stored representing the quality of communication links between nodes of the neighborhood for each node. A set of performance criterion of desired service in the neighborhood is stored. A set of possible link assignments between ones of the nodes in the neighborhood is generated from the table of quality data based upon a maximized performance criterion of desired service in the neighborhood. Link assignments are then allocated between nodes of the neighborhood based upon the desired performance criterion.

6 Claims, 1 Drawing Sheet

U.S. PATENT DOCUMENTS

| | | | |
|---|---|---|---|
| 4,688,259 | 8/1987 | Edridge | 455/13.3 |
| 4,730,310 | 3/1988 | Acampora et al. | 370/334 |
| 4,979,168 | 12/1990 | Courtois et al. | 370/349 |
| 5,038,398 | 8/1991 | Wills | 455/13.1 |
| 5,040,175 | 8/1991 | Tuch et al. | 370/245 |
| 5,046,066 | 9/1991 | Messenger | 370/349 |
| 5,117,422 | 5/1992 | Hauptschein et al. | 370/255 |
| 5,124,985 | 6/1992 | Hoshikawa | 370/347 |
| 5,164,942 | 11/1992 | Kamerman et al. | 370/334 |
| 5,197,127 | 3/1993 | Waclawsky et al. | 395/200.54 |
| 5,204,855 | 4/1993 | Beebee et al. | 370/436 |
| 5,204,856 | 4/1993 | Beebee et al. | 370/346 |
| 5,216,591 | 6/1993 | Nemirovsky et al. | 705/8 |
| 5,220,564 | 6/1993 | Tuch et al. | 370/338 |
| 5,226,045 | 7/1993 | Chuang | 370/332 |
| 5,231,634 | 7/1993 | Giles et al. | 370/348 |
| 5,239,673 | 8/1993 | Natarajan | 455/426 |
| 5,245,609 | 9/1993 | Ofek et al. | 370/235 |
| 5,291,474 | 3/1994 | Ikonen et al. | 370/281 |
| 5,291,475 | 3/1994 | Bruckert | 370/330 |
| 5,291,515 | 3/1994 | Uchida et al. | 375/200 |
| 5,506,848 | 4/1996 | Drakopoulos et al. | 370/336 |
| 5,652,751 | 7/1997 | Sharony | 370/227 |
| 5,719,868 | 2/1998 | Young | 370/346 |
| 5,742,593 | 4/1998 | Sharony et al. | 370/330 |

OTHER PUBLICATIONS

D. S. Stevens & M. H. Ammar, "Evaluation of Slot Allocations Strategies for TDMA Protocols in Packet Radio Networks", Proc. IEEE MILCOM '90, vol. 2, Oct. 1990, pp. 835–839.

D. S. Stevens & M. H. Ammar, "A Distributed TDMA Rescheduling Procedure for Mobile Packet Radio Networks", Proc. ICC '91, vol. 3, Jun., 1991, Abstract, pp. 1–26.

I. Chlamtac, A. Farago & H. Y. Ahn, "A Topology Transparent Link Activation Protocol for Mobile CDMA Radio Networks", IEEE J. On Selected Areas in Comm., vol. 12, No. 8, Oct. 1994, pp. 1426–1433.

SIMULTANEOUS CHANNEL ACCESS TRANSMISSION METHOD FOR A MULTI-HOP COMMUNICATIONS RADIO NETWORK

TECHNICAL FIELD OF THE INVENTION

The present invention relates to a method for dynamically assigning communication links between nodes in a multi-hop communications radio network.

BACKGROUND OF THE INVENTION

Mobile multi-hop broadcast packet radio networks are known for their rapid and convenient deployment, self-organization, mobility, and survivability. In this type of network, a transmission from one node is broadcast to all nodes in its "neighborhood", which typically are those nodes within one hop of the transmitting node. For the transmitted data to propagate multi-hops, the data must be relayed by one or more of the nodes to neighbors that are two hops away from the original transmitter. In this way, data will be relayed until it has arrived at all intended destination nodes.

Since there are generally limitations on the number of simultaneous transmitters that a receiver can successfully process, transmission schemes must be developed to dynamically and automatically manage radio frequency connectivity to provide spatial reuse of common channels. Without spatial reuse, if more than one node is transmitting at a time, on a common radio frequency channel, then the multiple transmissions would typically interfere with one another so that only one, or none of the transmissions would be transmitted and received successfully. Spatial reuse of a common channel can be accomplished since some nodes cannot hear other nodes, being spatially isolated, so that the same nodes may transmit at the same time without interfering with one another. The simultaneous transmissions provide significant network end-to-end improvements over networks using a common channel without spatial reuse.

A need has thus arisen for a method for dynamically and automatically managing radio frequency connectivity to provide communication links in a dynamic communications network of mobile nodes.

SUMMARY OF THE INVENTION

In accordance with the present invention, a method for establishing simultaneous communications between nodes having neighboring nodes in a multi-hop network of transceiver nodes arranged in neighborhoods, is provided. The method includes determining the quality of communication links between the nodes of a neighborhood and adjacent neighborhoods. A table of quality data is stored representing the quality of communication links between nodes of the neighborhood for each node. A set of performance criterion of desired service in the neighborhood is stored. A set of actual link assignments between ones of the nodes in the neighborhood is generated from the table of quality data based upon a maximized performance criterion of desired service in the neighborhood. Frequency and time slots to satisfy actual link assignments are then allocated between nodes of the neighborhood based upon the desired performance criterion.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
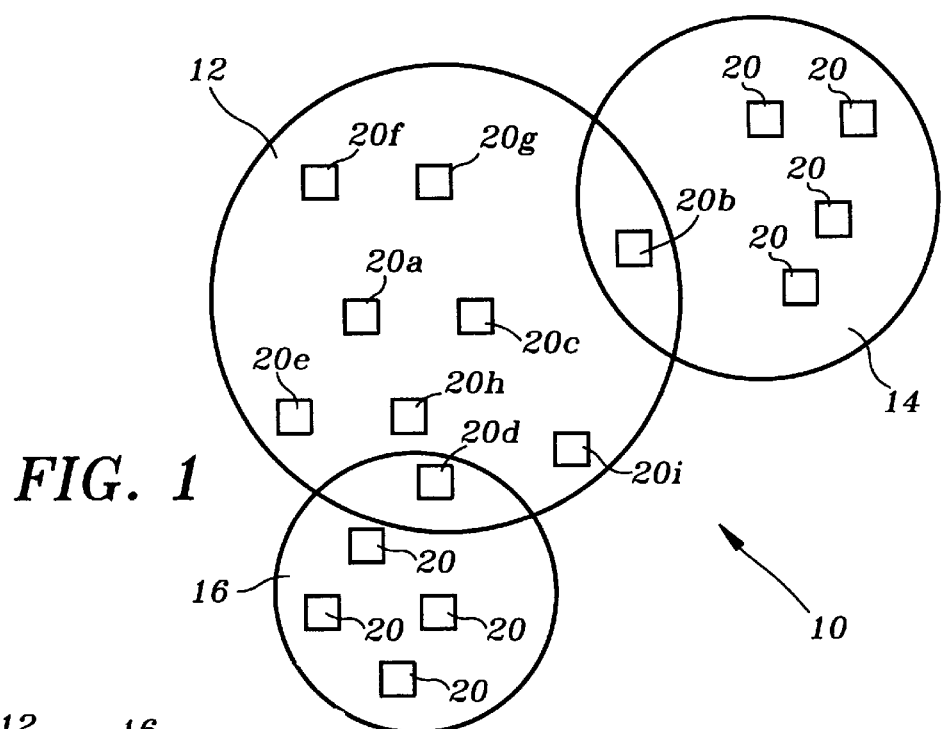
FIG. 1 is a schematic illustration of a community of neighborhoods wherein each neighborhood includes a network of nodes.

Referring to FIG. 1, a schematic illustration of a community 10 of neighborhoods 12, 14, and 16 utilizing the present method for establishing communication between nodes is illustrated. Each neighborhood 12, 14, and 16 includes a plurality of nodes 20. Nodes 20 communicate with each other in a specific neighborhood as well as with nodes outside their particular neighborhood. The hardware associated with each node 20 consists of a simplex transceiver with an omni-directional antenna. Thus, a node cannot transmit and receive at the same time, and a node cannot receive from more than one other node at a time. Nodes 20 may comprise, for example, radios manufactured by Hazeltine Radio Corporation Models PRC118, VRC99, or a Networked Trunked Radio (NTR) manufactured by Rockwell International Corporation. The present method maximizes network throughput by allowing several nodes 20 to broadcast at the same time on different channels or on the same channel if there is sufficient spatial separation between the nodes.

Nodes 20a–20i within neighborhood 12, communicate with each other without the use of a base station as is typical in a cellular type network. Location of nodes 20 within a neighborhood is variable due to the relative motion between nodes. Additionally, the number of nodes within a neighborhood is variable. The present method accommodates dynamic communication between nodes of the network as well as between nodes in different neighborhoods. For example, communication between nodes of neighborhood 14 with nodes of neighborhood 12 is via node 20b. Similarly, communication between nodes of neighborhood 12 with nodes of neighborhood 16 is via node 20d. Thus, a multi-hop communication network is established between neighborhoods 12, 14, and 16. Any number of nodes within a neighborhood are possible, nodes 20a through 20i within neighborhood 12, are shown for illustrative purposes only.

Each node 20 communicates during specific time slots and a frequency, and transmits self information to all other nodes within a neighborhood including for example, an identification number, traffic load and available power. Traffic load can include such information as potential destination and quantities and traffic as well as priority of communication. Each node 20 similarly, receives self-information from all other nodes within the network of a neighborhood. Therefore, potential quality of links between each node can be determined by each node. Each radio of node 20 includes detectors for measuring received power and signal to noise or bit error rate in order to determine the quality of links between nodes 20 in a neighborhood. This quality may include, for example, a reliable high performance link, a reliable link, a marginal link, or an undetectable link.

Figure 2:
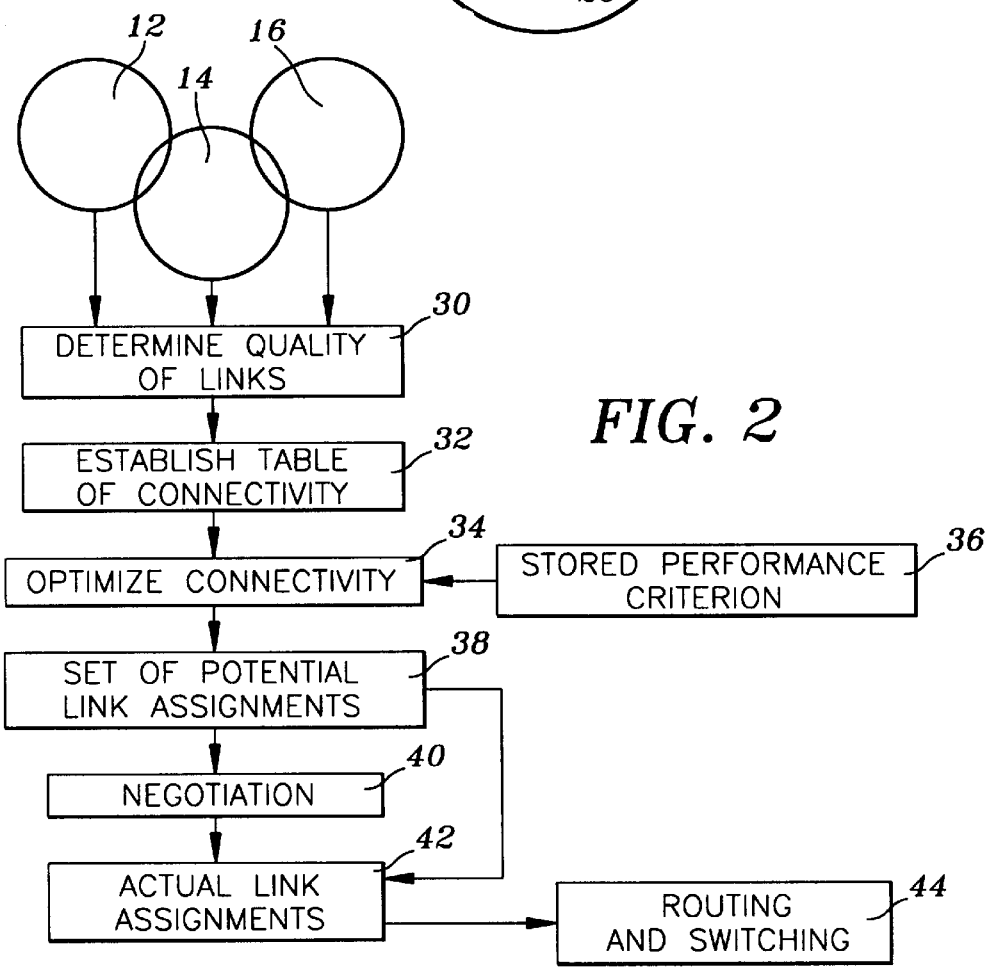
FIG. 2 is a block diagram of the steps of the method of the present invention.

Referring to FIG. 2, a block diagram of the present method is illustrated. As previously stated, each node 20 within a network 12, 14, or 16 determines the reliability of the communication links between itself and its neighboring nodes. Quality of each link is determined by each node at step 30. At step 32, a table of connectivities is established representing the quality of the link between each node and its neighboring nodes in a neighborhood. The data base created may also include position information of a node in a neighborhood, or a node's position with respect to the community of neighborhoods, or a previous position of a node.

The next step in the present method is to optimize the connectivities of the links between nodes 20 at step 34. The optimization process utilizes stored performance criterion stored at step 36. Optimization step 34 operates on the data collected at step 32 to optimize simultaneous transmission and throughput within the neighborhood based upon a desired performance criterion stored at step 36. The optimization step 34 utilizes cost functions optimization algorithms to make assignments of data according to the criterion of step 36. This criterion may include such elements as the number of network partitions, maximum throughput, traffic loading, traffic priority, and traffic quality of service along a link. The cost functions operate to compare the information within the data base of step 32 to variables in the cost function to obtain an optimum link assignment. An example of a cost function utilized at step 34 may include, for example, a Dijkstra shortest path. Other cost functions are described in a text book entitled "Applied Combinatorics" by Fred Roberts, published by Prentice-Hall, Inc., Copyright 1984.

The result of the optimization of connectivities at step 34 is a set of potential link assignments at step 38. The set of potential link assignments represent potential time slots and frequency allocations for simultaneous transmissions in a neighborhood. Based upon the configuration of the network, the set of potential link assignments may in fact be the actual link assignments for the neighborhood resulting in frequency and time slot allocations between the nodes at step 42 or a negotiation step may be required at step 40 in order to ensure contention free transmission before allocation can be made. If the nodes are spatially isolated, step 40 may be unnecessary. Negotiation step 40 is described in copending patent application Ser. No. 08/539,396 entitled "Dynamic Distributed, Multi-Channel Time Division Multiple Access Slot Assignment Method for a Network of Nodes", filed Oct. 5, 1995. Negotiation step 40 provides for contentionless simultaneous channel access transmission on multiple different channels with spatial reuse of identical channels in a neighborhood.

The actual link assignments form a grid network or mesh topology over which user traffic can be routed and switched at step 44. The mesh topology provides maximum throughput between nodes 20. Routing takes place within the mesh when each node views each packet, whereas switching along the mesh takes place along predetermined circuits constituting multiple links concatenated together. Switching of packets takes place upon specific packet identification. Routing and switching over the mesh takes place at step 44 provided the mesh has sufficient capacity. If the mesh lacks sufficient capacity, additional circuits can be built within the remaining capacity available to the network on the mesh.

It therefore can be seen that the present invention provides for a method for assigning communication links in a dynamic communication network of mobile nodes. The link assignments change in real time and are implemented in a neighborhood of nodes where the neighborhood position is changeable as well as the position of nodes within a neighborhood. The present method allows for the simultaneous transmission of nodes without interference, thus improving performance over non-spatial reuse communication systems.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A method for establishing communication between multiple nodes, comprising the steps of:

creating a multi-hop network including a plurality of nodes, each of said plurality of nodes operating in a transmit mode and a receive mode, the plurality of nodes arranged in neighborhoods, such that nodes operating in a transmit mode communicate simultaneously over links with multiple nodes in the neighborhood operating in a receive mode, and wherein a node operating in a receive mode can be a neighbor of more than one node operating in a transmit mode;

allocating frequency and time slots for each node to create link assignments between nodes of the neighborhood based upon desired performance criteria;

determining the quality of communication links between the nodes of a neighborhood and adjacent neighborhoods;

creating a table of data representing the quality of transmission between nodes of the neighborhood for each node;

storing a set of performance criterion of service desired;

generating a set of actual link assignments between ones of the nodes in the neighborhood from the table of data based upon a maximized performance criterion of service desired in the neighborhood; and allocating frequency and time slots to satisfy the actual link assignments between nodes of the neighborhood based upon the desired performance criterion.

2. The method of claim 1 and further including the steps of:

creating a mesh network based upon the actual link assignments, the mesh network having a capacity; and routing and switching user traffic over the mesh network.

3. The method of claim 2 and further including the step of:

creating additional network capacity where user traffic exceeds the mesh network capacity.

4. A method for establishing communication between multiple nodes, comprising the steps of:

creating a multi-hop network including a plurality of nodes, each of said plurality of nodes operating in a transmit mode and a receive mode, the plurality of nodes arranged in neighborhoods, such that nodes operating in a transmit mode communicate simultaneously over links with multiple nodes in the neighborhood operating in a receive mode, and wherein a node operating in a receive mode can be a neighbor of more than one node operating in a transmit mode;

allocating frequency and time slots for each node to create link assignments between nodes of the neighborhood based upon desired performance criteria;

determining the quality of communication links between the nodes of a neighborhood and adjacent neighborhoods;

creating a table of data representing the quality of transmission between nodes of the neighborhood for each node;

storing a set of performance criterion of service desired;

generating a set of potential link assignments between ones of the nodes in the neighborhood from the table of data based upon a maximized performance criterion of service desired in the neighborhood;

negotiating the set of potential link assignments to generate actual link assignments; and allocating frequency and time slots to satisfy the actual link assignments between nodes of the neighborhood based upon the desired performance criterion.

5. The method of claim 4 and further including the steps of:

creating a mesh network based upon the actual link assignments, the mesh network having a capacity; and routing and switching user traffic over the mesh network.

6. The method of claim 5 and further including the step of:

creating additional network capacity where user traffic exceeds the mesh network capacity.

* * * * *